E. P. WEST.
Band-Pulleys.

No. 134,778. Patented Jan. 14, 1873.

Witnesses
John W. Ripley
Geo. H. Collins.

Inventor
Elliott Pendleton West

UNITED STATES PATENT OFFICE.

ELLIOTT PENDLETON WEST, OF JERSEY CITY, NEW JERSEY.

IMPROVEMENT IN BAND-PULLEYS.

Specification forming part of Letters Patent No. 134,778, dated January 14, 1873.

*To all whom it may concern:*

Be it known that I, ELLIOTT PENDLETON WEST, of Jersey City, Hudson county and State of New Jersey, have invented a new and Improved Pulley for Sewing-Machines; and I hereby declare that the following is a full, clear, and exact description, reference being had to the accompanying drawing making a part of this specification.

Figure 1:
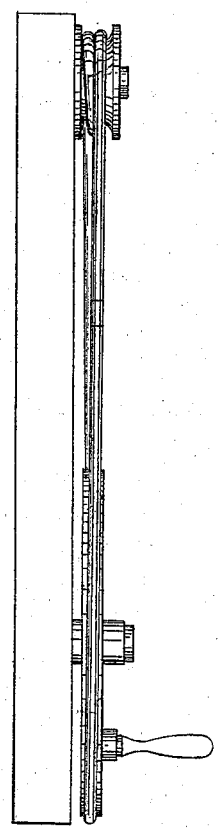
Figure 2:
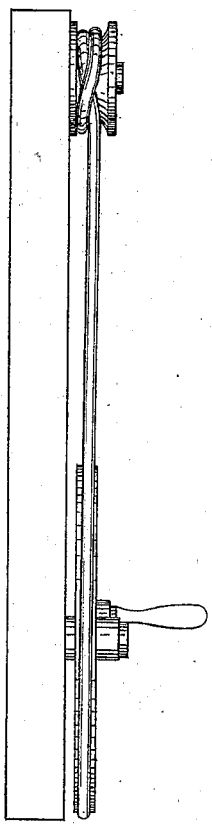
Figure 3:
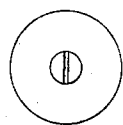
Figure 4:
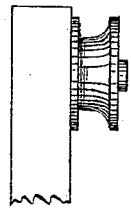

Figure 1 is a side view of my improved pulley with the belt attached; Fig. 2, the same as Fig. 1, but showing the action of the belt when the balance-wheel is turned back; Fig. 3, an end view of pulley; Fig. 4, side view of same.

Heretofore great trouble and inconvenience have been experienced in obtaining a pulley on which the belt would not slip, without having the belt so tight as to cause the machine to run hard. Efforts have been made to effect this by projections of various forms on the inner circumference of the pulley, and in other ways.

The object of my invention is to provide a smooth pulley on which a loose belt may be used.

I accomplish this by so tapering the groove of the pulley that the belt may be wound completely about it without danger of the belt riding over upon itself when the pulley is turned forward. The groove must be nearly flat for one width of belt to run on, and rise gradually toward the edge of the pulley nearest which the other width of belt is to run, and the effect will be that the second width of belt will crowd the first down upon the flat part of the groove, and prevent its tendency to ride up toward the other edge of the pulley. Turn the pulley the other way, and one width of belt will immediately cross the other and tighten upon it, effectually stopping the machine and indicating to the operator that the balance-wheel has been turned the wrong way.

What I desire to secure by Letters Patent is—

A pulley grooved substantially as described, on which a belt will operate in the manner explained.

ELLIOTT PENDLETON WEST.

Witnesses:
JOHN W. RIPLEY,
GEO. H. COLLINS.